(12) United States Patent
Toshida

(10) Patent No.: US 6,229,990 B1
(45) Date of Patent: May 8, 2001

(54) RADIO APPARATUS

(75) Inventor: Masahiro Toshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/512,601

(22) Filed: Feb. 25, 2000

(30) Foreign Application Priority Data

Feb. 26, 1999 (JP) .................................................. 11-051752

(51) Int. Cl.$^7$ .............................. H04B 1/00; H04B 7/00
(52) U.S. Cl. ........................ 455/69; 455/550; 455/573; 455/557; 455/556; 455/66; 455/343
(58) Field of Search .................... 455/556, 557, 455/550, 38.3, 572, 574, 66, 69, 573

(56) References Cited

U.S. PATENT DOCUMENTS

| | | | |
|---|---|---|---|
| 4,912,756 | * 3/1990 | Hop ........................................ | 379/60 |
| 5,479,479 | * 12/1995 | Braitberg et al. ..................... | 379/58 |
| 5,835,732 | * 11/1998 | Kikinis et al. ........................ | 395/281 |

* cited by examiner

Primary Examiner—William G. Trost
Assistant Examiner—Marceau Milord
(74) Attorney, Agent, or Firm—Jay H. Maioli

(57) ABSTRACT

A radio apparatus capable of downloading predetermined data such as music data from a download site through a radio communication line in which data is downloaded from a download site and sequentially written in a recording medium. When a voltage value of a battery becomes smaller than a threshold value required by a recording and reproducing section to write data in the recording medium, the downloading is interrupted. Thereafter, when an apparatus body is placed on a charging stand so that the voltage value becomes greater than the threshold value, the downloading of remaining data of the above-mentioned music data is resumed automatically. Thus, the radio apparatus can be miniaturized and made light in weight by using a battery of a small capacity as the battery. Further, the music data need not be downloaded over again from its beginning so that the communication charge can be avoided from being wasted. Furthermore, the downloading can be easily resumed by only placing the apparatus body on the charging stand.

5 Claims, 3 Drawing Sheets

| HEADER | DATA |
|---|---|

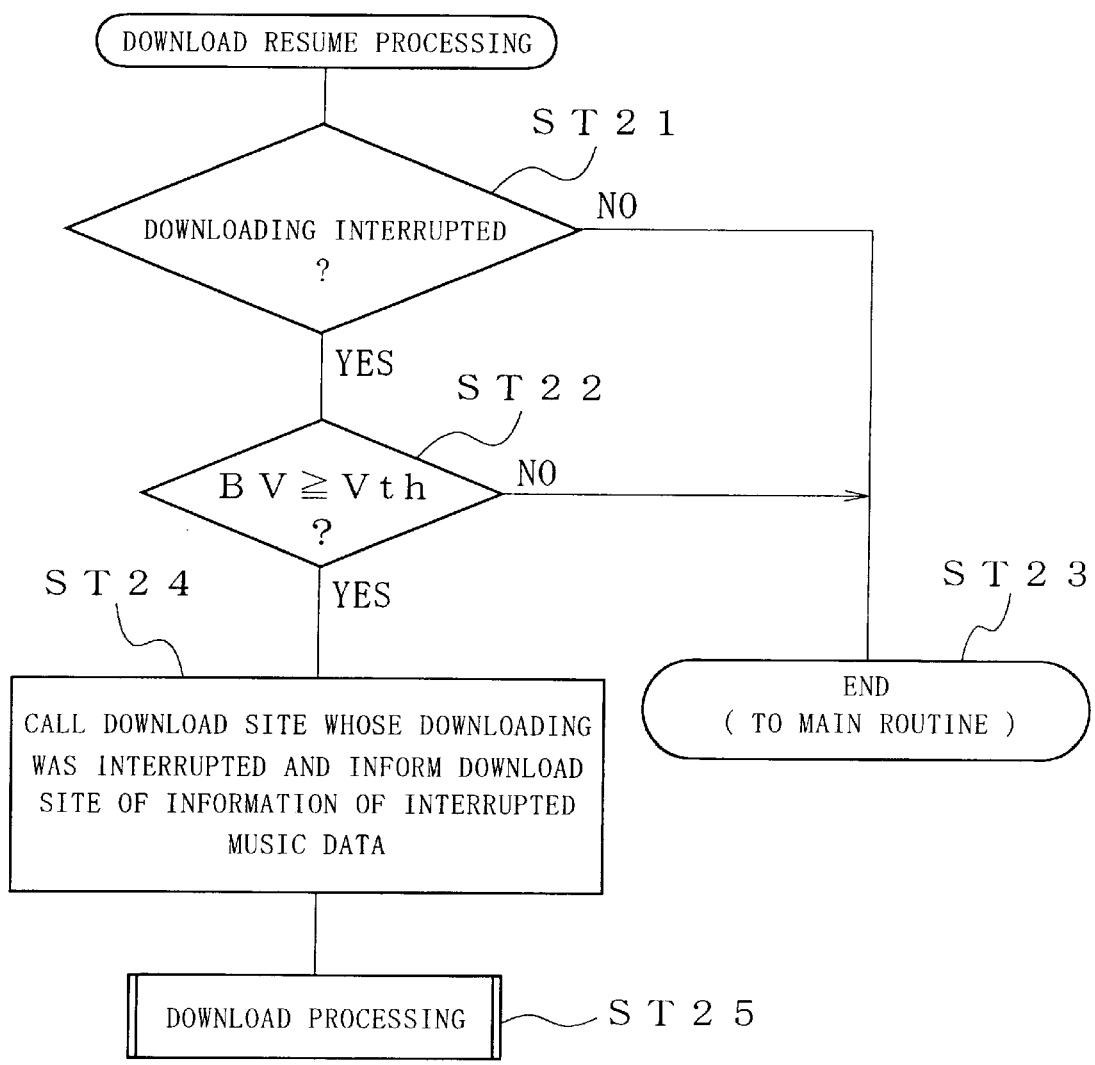

RADIO APPARATUS

BACKGROUND OF THE INVENTION

The present invention relates to a radio apparatus capable of downloading predetermined data such as music data from a download site through a radio communication line.

Heretofore, there is proposed a radio apparatus such as a portable telephone capable of downloading music data from a server of a download site through a radio communication line. In this case, the music data thus downloaded may be written in a detachable recording medium, for example, and reproduced therefrom after the downloading.

The above-mentioned radio apparatus may use a battery of a small capacity as a rechargeable battery in accordance with the current in which radio apparatus become more and more compact in size and light in weight. As a result, it is frequently observed that a voltage value of a battery becomes smaller than a threshold value necessary for writing data in a recording medium during music data of a certain piece of music is downloaded. In that case, the downloading should be interrupted, and music data should be downloaded over again from the beginning of the music after the battery was charged or the battery was replaced with a charged battery. Consequently, a communication charge is wasted unavoidably.

SUMMARY OF THE INVENTION

It is an object of the present invention to provide a radio apparatus which can be miniaturized and made light in weight by using a battery of a small capacity and in which a communication charge can be avoided from being wasted.

According to an aspect of the present invention, there is provided a radio apparatus powered by a rechargeable battery and which is capable of downloading predetermined data through a radio line. This radio apparatus is comprised of a data transmission request means for requesting the download site to transmit said predetermined data, a data reception means for receiving the predetermined data transmitted from the download site, a data recording means for sequentially writing the predetermined data received at the data reception means in a recording medium, a voltage detection means for detecting a voltage value of the battery, a write interrupt control means for interrupting the data recording means to write the predetermined data when a voltage value detected by the voltage detection means becomes smaller than a threshold value required by the data recording means to write data in the recording medium, line disconnection means for disconnecting a line between the radio apparatus and the download site when the writing of the predetermined data is interrupted, a memory means for memorizing a telephone number of the download site and information of the predetermined data the writing of which was interrupted, a line connection means for connecting a line between the radio apparatus and the download site by using the download site telephone number memorized in the memory means when the voltage detected by the voltage detection means becomes greater than the threshold value after the line was disconnected, a data resend request means for requesting the download site to transmit remaining data of the predetermined data the writing of which was interrupted by informing the download site of information of the predetermined data memorized in the memory means after the line was connected and a resume control means for controlling the data recording means such that the recording means writes the remaining data received at the data reception means in the recording medium.

In this invention, the download site is requested to transmit predetermined data such as music data of a certain piece of music, and the predetermined data transmitted from the download site is sequentially written in a recording medium such as an IC memory. In this case, when a voltage value of a battery becomes smaller than a threshold value required by the data recording means to write data in the recording medium, the writing is interrupted, and a line between the radio apparatus and the download site is disconnected temporarily. When an apparatus body, for example, is placed on a charging stand so that the voltage of the battery may become greater than the threshold value, the downloading is resumed automatically, and remaining data of the predetermined data is sequentially written in the recording medium.

When the line between the radio apparatus and the download site is disconnected temporarily, the download site telephone number and the information of the predetermined data the writing of which was interrupted are memorized in the memory section, and are used to resume the download processing which will be executed if other recording medium is loaded. In this case, the download site telephone number is used to connect the line between the radio apparatus and the download site. The information of the predetermined data (information of title of music and time and position in and at which the writing was interrupted, or the like if the predetermined data is music data) is used as notifying information that may request the download site to transmit only the remaining data of the predetermined data the writing of which was interrupted.

BRIEF DESCRIPTION OF THE DRAWINGS

FIG. 4 is a flowchart to which reference will be made in explaining the manner in which a control section controls a download resume processing.

DETAILED DESCRIPTION OF THE PREFERRED EMBODIMENT

Figure 1:
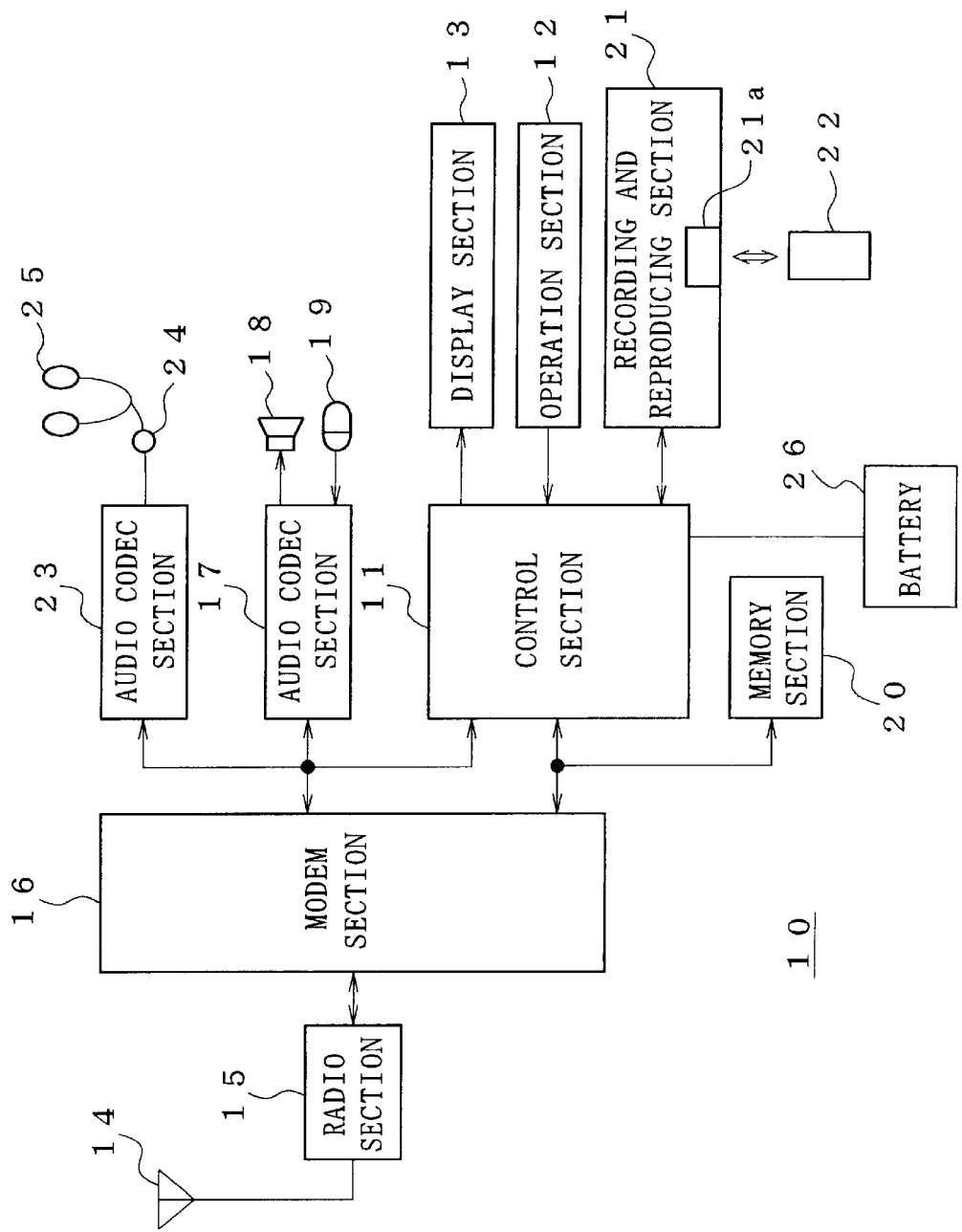
FIG. 1 is a block diagram showing an arrangement of a radio apparatus according to an embodiment of the present invention.

FIG. 1 of the accompanying drawings is a block diagram showing an arrangement of a radio apparatus 10 according to an embodiment of the present invention. As shown in FIG. 1, this radio apparatus 10 may include a telephone function and a function to download music data of desired music from a download site.

The radio apparatus 10 may include a control section 11 having a computer to control an operation of the whole of the radio apparatus 10. This control section 11 may have connected thereto an operation section 12 having disposed therein ten-keys for enabling a user to execute a variety of operations and a display section 13 comprised of, for example, an LCD (liquid-crystal display), for example, or the like to display operation commands to a user and the state of the radio apparatus 10, or the like.

The radio apparatus 10 may include a transmission and reception antenna 12, a radio section 15 for obtaining a baseband reception signal by effecting a frequency-converting processing and an amplifying processing on an RF signal received at the antenna 12 and obtaining an RF signal by effecting a frequency-converting processing and an amplifying processing on a baseband transmission signal generated from a modem section 16, which will be described later on, and a modem section 16 for obtaining reception data by demodulating the reception signal supplied from the radio section 15, extracting control data, audio data supplied to the control section 11 from this reception data and music data from the download site, obtaining transmission data from the control data of the control section 11 and audio data from an audio codec section 17, which will be described later on, and generating a baseband transmission signal by modulating this transmission data.

The radio apparatus 10 may include the audio codec section 17 for obtaining a reception audio signal by effecting a decoding processing on audio data (compression-coded data such as ADPCM(adaptive differential pulse code modulation) extracted by the modem section 16, supplying this reception audio signal to a speaker 18 serving as a telephone receiver, obtaining audio data by effecting a compression-coding processing on a transmission audio signal from a microphone 19 serving as a telephone transmitter and supplying this audio data to the modem section 16. The audio codec section 17, the speaker 18 and the microphone 19 are sections concerning the telephone function of the radio apparatus 10.

The radio apparatus 10 may include a memory section 20 formed of a non-volatile memory, or the like and a recording and reproducing section 21 in which music data extracted from the modem section 16 and supplied from the download site is written in the recording medium 22 and in which music data is reproduced from the recording medium 22. The recording medium 22 may be a detachable IC memory, for example, and the recording and reproducing section 21 may include a loading section 21a for loading the recording medium 22 thereon.

Music data from the download site may comprise a series of data blocks (data frames) each having a constant data length, for example. Each data block has an arrangement shown in FIG. 2, for example. That is, the data block may comprise a header portion and a data portion. Music data itself may be located in the data portion. The header portion may have disposed therein information concerning music data located at the data portion, time information indicating a title of music and the entire time of music, for example, and information indicative of time position of music data located in the data portion.

Referring back to FIG. 1, the radio apparatus 10 may include an audio codec section 23 for obtaining a reproduction audio signal by effecting a decoding processing on the above-mentioned music data (compression-coded data such as ATRAC) read out from the recording medium 22 and for supplying this reproduction audio signal to an output terminal 24. A headphone 25, for example, may be connected to the output terminal 24.

The radio apparatus 10 may include a battery 26 serving as a power supply of the whole of the radio apparatus 10. This battery 26 might be a rechargeable battery, and may be charged when an apparatus body, for example, is placed on a charging stand (not shown). The control section 11 may be served also as a voltage detection means for detecting a voltage value BV of the battery 26.

An operation of the radio apparatus 10 shown in FIG. 1 will be described below.

The manner in which a user makes a telephone communication by using the telephone function will be described in brief. In this case, when a user makes an outgoing call by the operation section 12, an outgoing call processing is executed under control of the control section 11, and a line between the radio apparatus 10 and the called person may be established, thereby resulting in a telephone communication state being established. Also, when a user answers the incoming call by the operation section 12, the line between the radio apparatus 10 and the called person may be established under control of the control section 11, thereby resulting in the telephone communication state being established. In the telephone conversation state, audio data of the called person extracted from the reception data by the modem section 16 is decoded by the audio codec section 17, and a resultant reception audio signal is supplied to the speaker 18. The transmission audio signal from the microphone 19 is compression-coded by the audio codec section 17, and resultant audio data is supplied to the modem section 16 and thereby transmitted to the called person.

An operation concerning a downloading of music data will be described. In this case, when a user calls the download site by the operation section 12, an outgoing call processing is executed under control of the control section 11, and a line between the radio apparatus 10 and the download site may be established. In this state, music information transmitted from the download site may be displayed on the display section 13 under control of the control section 11. In this state, when a user selects a downloaded music by the operation section 12, such selection information may be transmitted from the control section 11 to the download site, and the downloading of music data of the selected music may be started.

When the downloading may be started, music data extracted from the reception data by the modem section 16 may be supplied through the control section 11 to the recording and reproducing section 21 and thereby sequentially written in the data area of the recording medium 22. The manner in which the control section 11 controls the download processing will be described in detail with reference to a flowchart of FIG. 3.

Figures 2, 3:
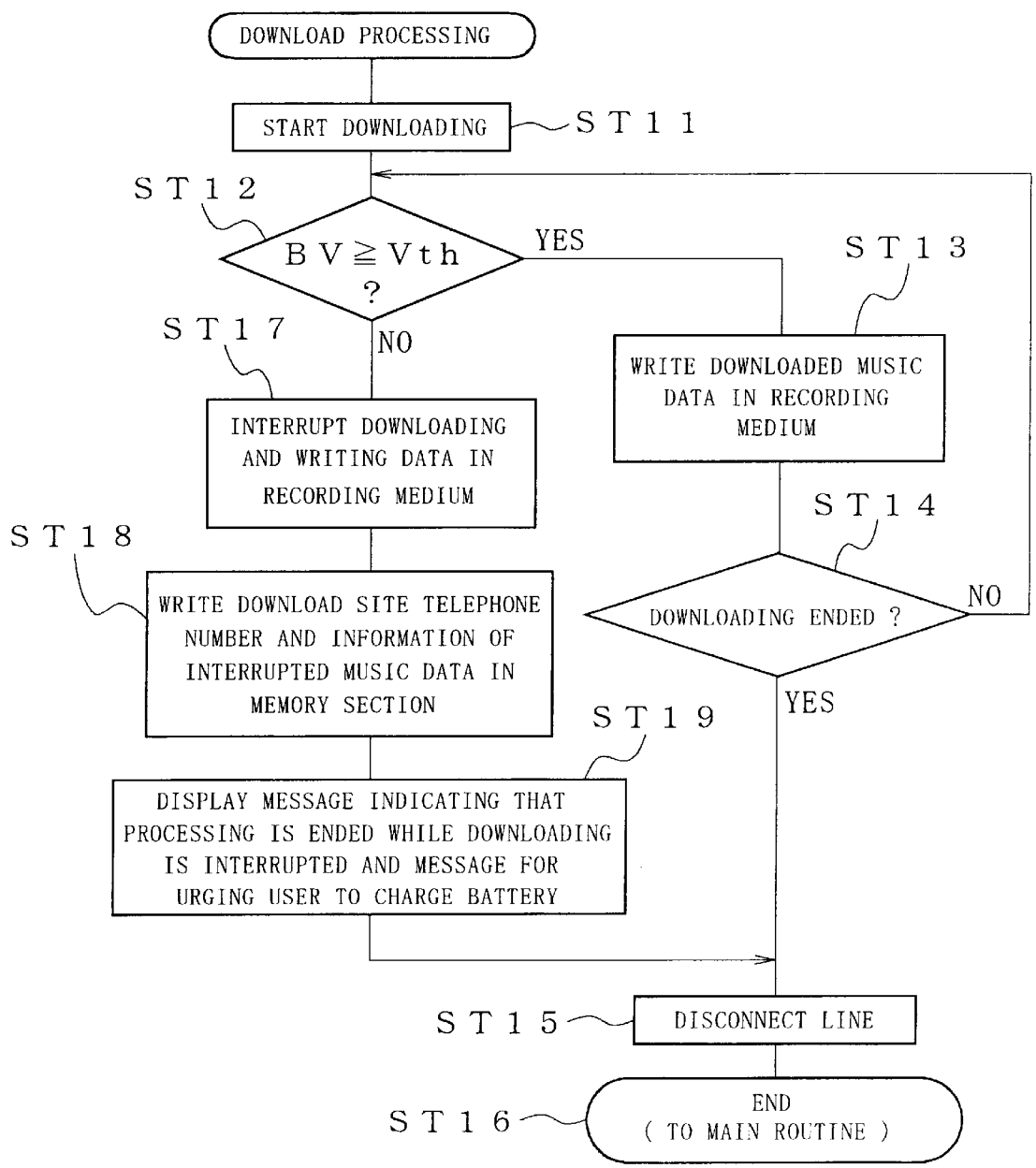
FIG. 2 is a diagram showing an arrangement of a data block of downloaded music data.
FIG. 3 is a flowchart to which reference will be made in explaining the manner in which a control section controls a download processing.

Referring to FIG. 3, when a user selects a downloaded music by the operation section 12, control goes to a step ST11, whereat music selection information is transmitted to the download site and the downloading is started.

Control goes to the next decision step ST12, whereat it is determined whether or not the voltage value BV of the battery 26 is greater than a threshold value Vth required by the recording and reproducing section 21 to write data in the recording medium 22. If the voltage value BV is greater than the threshold value Vth as represented by a YES at the decision step ST12, then control goes to a step ST13. At the step ST13, the downloaded music data which was extracted by the modem section 16 is supplied to the recording and reproducing section 21 and thereby sequentially recorded on the recording medium 22. Then, control goes to the next decision step ST14, whereat it is determined whether or not the downloading is ended. The music data is continuously written in the above-mentioned recording medium 22 until the voltage value BV of the battery 26 becomes greater than the threshold value Vth and the downloading is ended. If the downloading is ended as represented by a YES at the decision step ST14, then control goes to a step ST15, whereat a line between the radio apparatus 10 and the download site is disconnected. Then, control goes to a step ST16, whereat the processing is ended.

If the voltage BV of the battery 26 is smaller than the threshold voltage Vth as represented by a NO at the decision step ST12, then control goes to a step ST17. At the step ST17, the radio apparatus 10 informs the download site of the interruption of the downloading, and the writing of the music data in the recording medium 22 is stopped. Then, control goes to a step ST18, whereat the download site telephone number and the information of the interrupted music data are written in the memory section 20. Control goes to a step ST19, whereat the display section 13 may display a message indicating that the processing is ended while the downloading is interrupted and a message for urging the user to charge the battery. Thereafter, control goes to the step ST15, whereat the line between the radio apparatus 10 and the download site may be disconnected. Then, the processing is ended at the step ST16.

The above-mentioned download site telephone number may be used to establish the line between the radio apparatus 10 and the download site, as will be described later on. The information of the music data the writing of which was interrupted might be information of a title of music and time and position in and at which the writing was interrupted, and may be used as notifying information to request the download site to transmit only the remaining data of the music data the writing of which was interrupted, as will be described later on.

As described above, when the processing is ended while the downloading is interrupted, if the apparatus body is placed on the charging stand, then the voltage value BV of the battery 26 becomes greater than the threshold value Vth, thereby resulting in the download processing being resumed. The manner in which the control section 11 controls the download resume processing will be described in detail with reference to a flowchart of FIG. 4.

Referring to FIG. 4, initially, it is determined at a decision step ST21 whether or not the downloading is interrupted. If the downloading is interrupted as represented by a YES at the decision step ST21, then control goes to the next decision step ST22. At the decision step ST22, it is determined whether or not the voltage value BV of the battery 26 is greater than the threshold value Vth. If the downloading is not interrupted as represented by a NO at the step ST21 and if the voltage value BV is smaller than the threshold value Vth as represented by a NO at the decision step ST22, then control goes to a step ST23, whereat the processing is ended.

If the voltage value BV of the battery 26 is greater than the threshold value Vth as represented by a YES at the decision step ST22, then control goes to a step ST24. At the step ST24, the user calls the download site the downloading of which was interrupted by using the download site telephone number memorized in the memory section 20 at the step ST18 of the above-mentioned download processing to thereby establish the line between the radio apparatus 10 and the download site. Thereafter, the user informs the download site of the information of the interrupted music data similarly written in the memory section 20 at the step ST18 to thereby request the download site to transmit the remaining data of the music data the writing of which was interrupted. Then, at a step ST25, control goes to the above-mentioned download processing.

In the embodiment of the present invention, the download processing and the download resume processing are executed as described above. Thus, when the voltage value BV of the battery 26 becomes smaller than the threshold value Vth so that the writing of music data of some music in the recording medium 22 is interrupted, if the voltage value BV of the battery 26 becomes greater than the threshold value Vth later on, then the downloading may be automatically resumed, and the writing of the remaining data of the music data the writing of which was interrupted may be started on the recording medium 22 as described above. Therefore, the radio apparatus can be miniaturized and made light in weight by using a battery of a small capacity as the battery 26. Moreover, the music data of some music need not be downloaded over again from its beginning so that the communication charge can be avoided from being wasted. Furthermore, since the downloading is automatically resumed when the voltage BV of the battery 26 becomes greater than the threshold value Vth, the downloading can be easily resumed by only placing the apparatus body on the charging stand.

The manner in which music data of some music is reproduced from the recording medium 22 as described above will be described next. In this case, when the user operates the operation section 12, the recorded contents of the recording medium 22 loaded on the loading section 21a of the recording and reproducing section 21 are displayed on the display section 13 under control of the control section 11. This display is executed with reference to a TOC information area (not shown) of the recording medium 22. When the user selects a reproduced music by the operation section 12, under control of the control section 11, the recording and reproducing section 21 resumes the reading of the music data of the selected music from the recording medium 22.

The music data read out from the recording medium 22 by the recording and reproducing section 21 is supplied through the control section 11 to the audio codec section 23. Then, this audio codec section 23 decodes the music data to provide a reproduced audio signal. This reproduced audio signal is supplied to the output terminal 24. Therefore, the user can listen to the selected music by connecting the headphone 25, for example, to the output terminal 24.

While the predetermined data downloaded and written in the recording medium 22 is the music data as described above, the predetermined data which is to be downloaded is not limited to the music data. The present invention can satisfactorily be applied to data whose continuity is required, such as still picture data and moving picture data.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claim.

What is claimed is:

1. A radio apparatus powered by a rechargeable battery for downloading predetermined data through a radio communication line, said radio apparatus comprising:

data transmission request means for requesting a download site to transmit said predetermined data;

data reception means for receiving said predetermined data transmitted from said download site;

data recording means for sequentially writing said predetermined data received at said data reception means in a recording medium;

voltage detection means for detecting a voltage value of said rechargeable battery;

write interrupt control means for interrupting said data recording means writing said predetermined data when the voltage value detected by said voltage detection means is smaller than a threshold value required by said data recording means to write data in said recording medium;

line disconnection means for disconnecting the radio communication line between said radio apparatus and said download site when the writing of said predetermined data is interrupted;

memory means for memorizing a telephone number of said download site and information of said predetermined data when the writing is interrupted;

line connection means for connecting the radio communication line between said radio apparatus and said download site by using said download site telephone number memorized in said memory means when the voltage value detected by said voltage detection means is greater than said threshold value required by said data recording means after said line was disconnected by said line disconnection means;

data resend request means for requesting said download site to transmit remaining data of said predetermined data after a writing interruption by informing said download site of information of said predetermined data memorized in said memory means after said radio communication line is connected by said line connection means; and resume control means controlling said data recording means for resuming writing of said remaining data received at said data reception means in said recording medium.

2. The radio apparatus according to claim 1, further comprising display means for displaying a message for a user to charge said battery when the voltage value detected by said voltage detection means is smaller than said threshold value and said data recording means interrupts the writing of said predetermined data.

3. The radio apparatus according to claim 1, further comprising data reproducing means for reading out data from said recording medium in which said predetermined data was written.

4. The radio apparatus as claimed in claim 1, wherein said predetermined data is music data.

5. The radio apparatus as claimed in claim 1, further comprising an apparatus body housing said battery therein, so that said battery is charged when said apparatus body is placed on a charging stand.

\* \* \* \* \*